United States Patent [19]

Lange

[11] Patent Number: 4,775,258
[45] Date of Patent: Oct. 4, 1988

[54] CONNECTING APPARATUS

[75] Inventor: Frederic A. Lange, Osseo, Minn.

[73] Assignee: Interlock Structures International, Inc., Minneapolis, Minn.

[21] Appl. No.: 3,580

[22] Filed: Jan. 15, 1987

Related U.S. Application Data

[63] Continuation-in-part of Ser. No. 712,229, Mar. 15, 1985, Pat. No. 4,637,193, which is a continuation-in-part of Ser. No. 590,738, Mar. 16, 1984, abandoned.

[51] Int. Cl.⁴ ............................................... F16D 1/00
[52] U.S. Cl. ................................... 403/171; 403/176; 403/381
[58] Field of Search ............... 403/381, 331, 172, 171, 403/176; 52/646, 648; 182/178

[56] References Cited

U.S. PATENT DOCUMENTS

| | | |
|---|---|---|
| 1,019,778 | 3/1912 | Fredrickson . |
| 2,060,548 | 11/1936 | Bolling . |
| 2,149,844 | 3/1939 | George . |
| 2,948,409 | 8/1960 | Wroblewski . |
| 3,552,056 | 1/1971 | Meates . |
| 3,901,613 | 8/1975 | Andersson . |
| 3,914,060 | 10/1975 | Miller et al. . |
| 4,019,298 | 4/1977 | Johnson, IV . |
| 4,023,913 | 5/1977 | Berkowitz . |
| 4,044,497 | 8/1977 | Bettens . |
| 4,313,687 | 2/1982 | Apeztequi . |
| 4,340,318 | 7/1981 | Bush . |
| 4,343,562 | 8/1982 | Almeland . |
| 4,637,193 | 1/1987 | Lange ................................. 403/381 |

FOREIGN PATENT DOCUMENTS

| | | |
|---|---|---|
| 2326736 | 12/1974 | Fed. Rep. of Germany . |
| 1027229 | 5/1953 | France . |
| 1294500 | 4/1962 | France . |
| 6704463 | 9/1968 | Netherlands . |

OTHER PUBLICATIONS

MERO System Brochure, by Unistrut (GTE), 35005 Michigan Avenue West, Wayne, MI 48184.

Primary Examiner—Andrew V. Kundrat
Attorney, Agent, or Firm—Merchant, Gould, Smith Edell, Welter & Schmidt

[57] ABSTRACT

Interconnecting apparatus (10) for a pair of structural members or space frame assemblies is disclosed. Apparatus (10) includes a button (12) attached to an end of one structural member and a receiver (18) attached to the end of another structural member. Receiver (18) includes a cradle (38) with a wall (40) on one side and a lip (42) on the other. Button (12) fits snugly into cradle (38) between wall (40) and lip (42) and is retained there by a locking mechanism, such as clip (24). Interconnect mechanism (10) may be used in a variety of applications including connecting a pair of trusses together and creating a space frame structure.

12 Claims, 6 Drawing Sheets

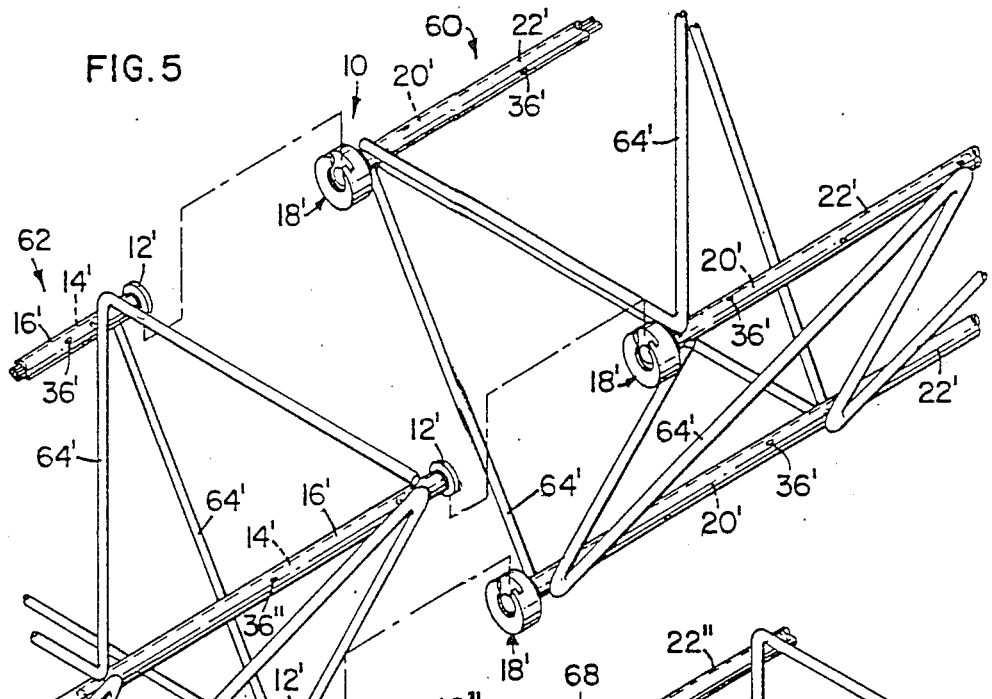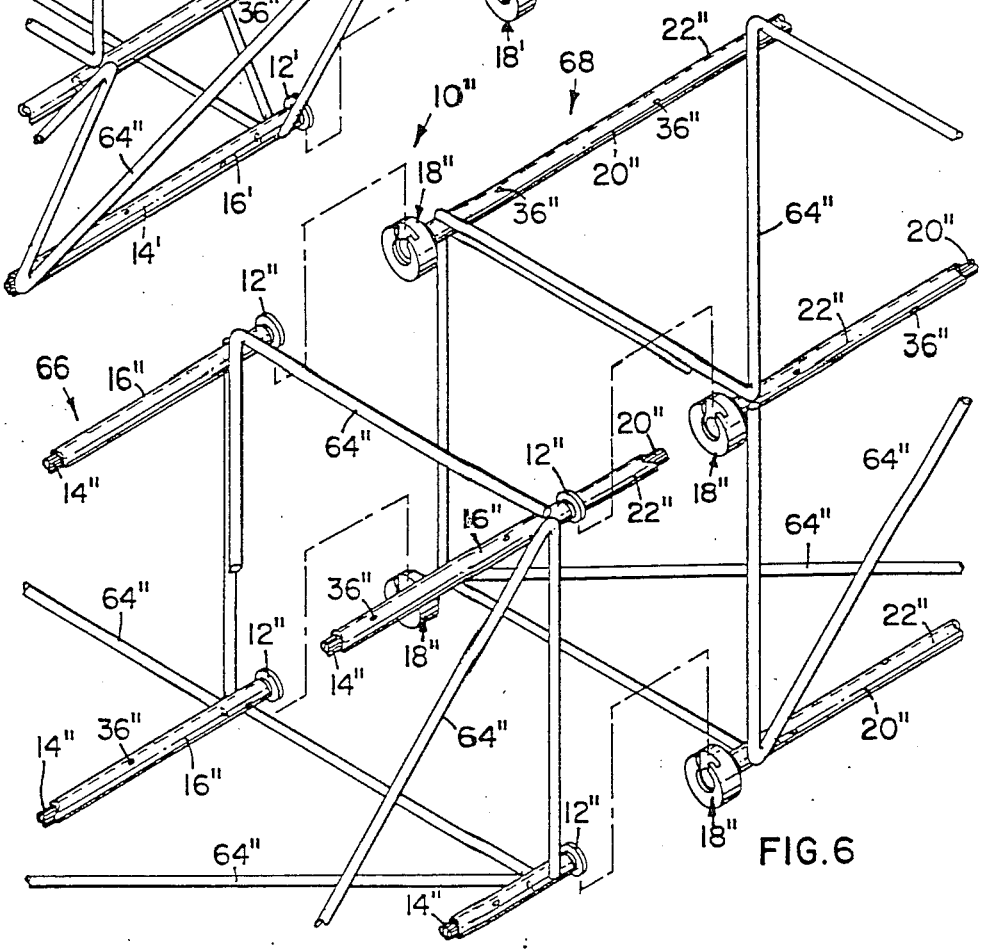

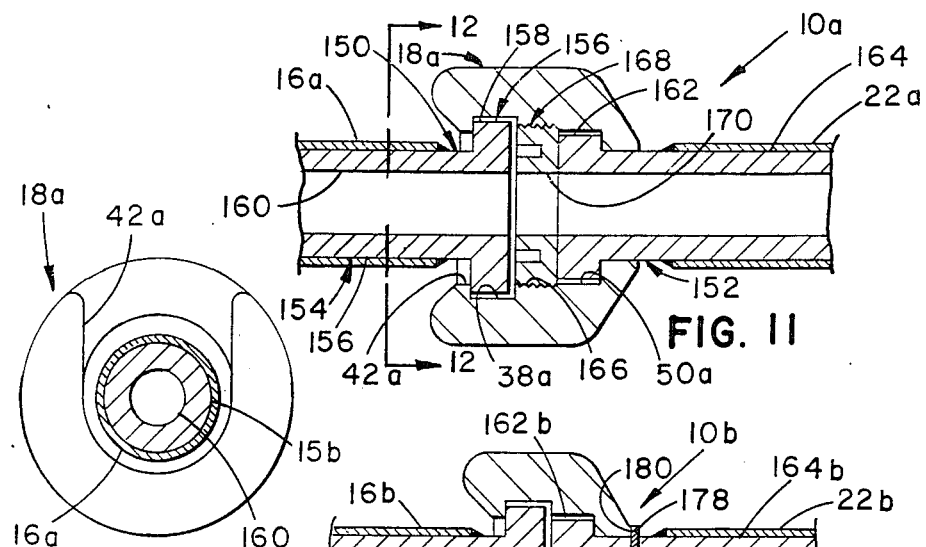
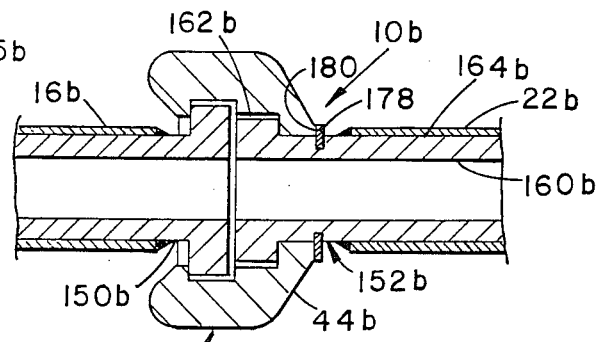
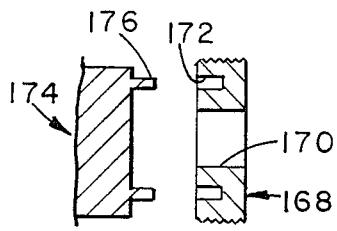
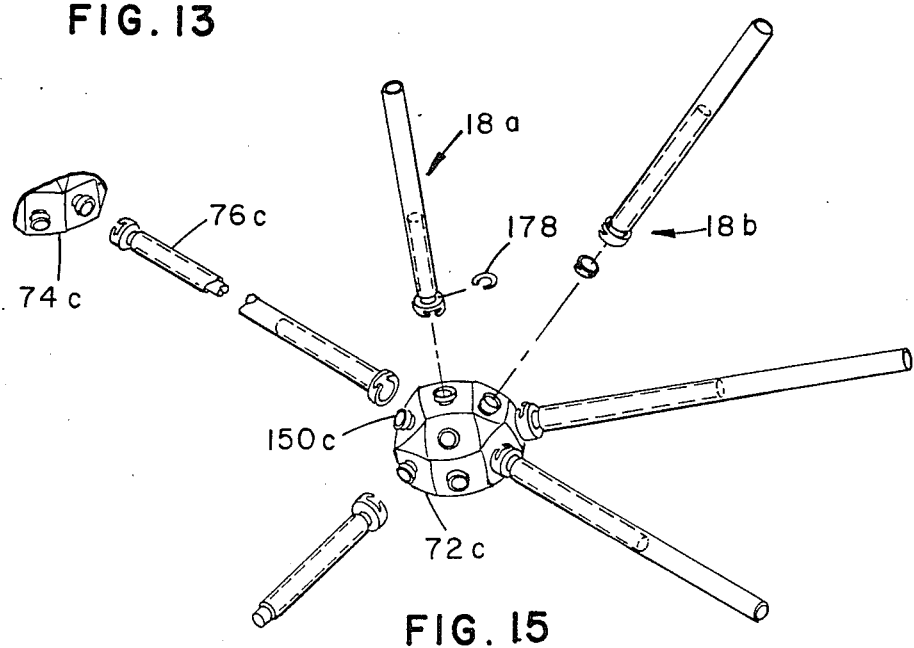

CONNECTING APPARATUS

The present application is a Continuation-In-Part application of pending application Ser. No. 712,229 filed Mar. 15, 1985 now U.S. Pat. No. 4,637,193, which was a Continuation-In-Part of application Ser. No. 590,738, filed Mar. 16, 1984, now abandoned.

FIELD OF THE INVENTION

The present invention is directed to connecting apparatus between structural members, such as structural tubes, trusses, space frame nodes and other such structural assemblies.

BACKGROUND OF THE INVENTION

A truss is understood to comprise a plurality of parallel tubes, bars, rods or other straight members held spaced apart at various points along the length of each of the members in order to form a stronger structural member than each member would be individually. For fabrication or other reasons, the trusses have lengths which are usually shorter than a span across which they are to extend. Consequently, it is necessary to connect trusses end to end and, also, to connect end trusses to structural walls or other such items. The almost universal mechanism for making such a connection is to bolt one truss to another or to bolt the truss to a structural wall. Nut and bolt connections are positive, and structural adequacy is easily verified. The disadvantage with nut and bolt connections is that they are time consuming to accomplish and, consequently, expensive.

A space frame commonly includes a plurality of nodes and tubes in various arrangements depending on the application. Space frames are used to support roofs, walkways, scaffolding, and often provide modern looking structural support in architecturally pleasant buildings such as halls, churches, office buildings, etc. More particularly, a space frame is usually constructed by a single tube extending between a pair of nodes. Each node has a plurality of faces and can receive a tube at each face. Therefore, it is common for a number of tubes to be attached to a single node so that a complex, but usually uniform, pattern is formed.

Representative connecting devices are shown in a number of patents. For example, U.S. Pat. No. 2,149,844 shows a sleeve device into which one or more tubes may be inserted and welded. U.S. Pat. No. 4,343,562 shows a somewhat different structure but also utilizes the concept of inserting a tubular member into a core member and welding the two. Other patents show different concepts. For example, U.S. Pat. No. 3,914,060 shows a node member having a plurality of studs with sleeves attached thereto for threading onto ends of tubular sections. U.S. Pat. No. 4,023,913 shows a connector having socket-like ends over which tubular members fit. U.S. Pat. No. 4,313,687 shows a node having a plurality of threaded openings, each of which are for receiving a bolt retained to an end of a tube. A pair of threaded bodies attached to the bolt function to tighten the tube to the node. Other commercial systems are available which actually have a threaded rod fixed at the end of a tube for threading into a threaded opening in a node. Finally, still a different concept is shown in U.S. Pat. No. 4,340,318 wherein a node connection includes a plurality of half joints having semicircular tongue and groove elements with tubes having similar tongue and groove elements mating therewith. Locking latches are provided to keep the halves from separating.

Some of these various connectors are less complex than others, and some are less expensive to make and use. In general, however, various presently known connectors require a significant amount of work time to complete the connection. That is, a welder must weld, or a laborer must thread one piece to another. U.S. Pat. No. 4,340,318 perhaps requires a lesser amount of assembly time, but likely is fairly expensive to manufacture due to the complex design of the tongue and groove assembly and the locking latch assembly.

Thus, although numerous connecting assemblies are known, there continues to be a need for improvements which will simplify and make less expensive without decreasing structural strength or reliability. In this regard, the present invention advances connector art significantly.

SUMMARY OF THE INVENTION

The present invention is directed to interconnect mechanism between first and second structural members. The mechanism includes a button fastened to the first structural member. The mechanism further includes a receiver for the button formed as an arcuately shaped cradle having a wall on one side and a lip on an opposing side. The receiver is fastened at the wall to the second structural member. In this way, receipt of the button within the cradle simply, yet sufficiently, interconnects the two structural members together.

More specifically, the button is generally in the form of a solid cylinder with an axial opening for allowing the shaft of a bolt to pass through. A cavity at one end of the button receives the head of the bolt. The structural tube preferably includes a solid rod plug at its end. The bolt is then threaded into the plug to fasten the button to the tube.

The receiver is also a cylindrical block, but has a cavity extending inwardly from the cylindrical wall. The cavity has a semi-cylindrical end coaxial with the axis of the block. A slot in one end of the block extending to the cavity is necessary for receiving the solid rod to which the button is fastened when the button is received by the cradle formed by the semi-cylindrical cavity. The solid end wall of the receiver has an axial passage for a bolt to pass therethrough with a cavity for the head of the bolt. As with the button, the receiver is fastened with the bolt to a solid rod welded or otherwise attached in the end of the second structural tube.

Preferably, the dimensions of the button match relatively closely the dimensions of the cavity so that the button, although loose, is snugly received in the cradle. Such connection is then not only quite solid, but provides structural strength which is predictable and can be used advantageously for design purposes.

In an alternate embodiment button members comprise both the button and the solid rod plug fastened in the ends of a structural tube. In this way, bolts are not needed to attach the buttons to the solid rod plug. Rather, the smaller cylindrical rod plug portion of the button member is welded in an end of a structural tube to provide the appropriate connection. This embodiment is most advantageous when axial passageways extend through the button members from one end to another so that the connect apparatus can provide communication through the connection from one structural member to another to allow passage of an electrical wire fluid, light or some other such material or energy form. A receiver is held to one of the structural tubes by the button member. In this regard, the receiver includes a second passageway through which the solid rod portion of one of the button members passes in order to fasten the receiver to one of the structural members. It is preferable to have a movement limiting mechanism to retain the receiver rather snugly against the button of the button member, rather than allowing it to slide along the solid rod portion between the button and the end of the tube. Preferably, also the receiver is rotatably fastened so that the cradle may be aligned as necessary for receiving a mating button before being rotated to perform a locking function, if desired.

A further feature of the present connector invention includes a keeping or locking mechanism for preventing the button from sliding from the cradle. Although several such locking mechanisms may be equivalent, a simple such mechanism includes a clip having one leg inserted in an opening in the receiver wall adjacent to the top of the button with another leg frictionally retained at the top of the receiver wall. Such feature is simple, rapid to assemble, and advantageously alleviates any concern of the button bouncing from the cradle under circumstances which might otherwise cause such disconnection.

The interconnection mechanism of the present invention is advantageously applicable for connecting a pair of truss members together. A button is attached to each tube or elongated member of a first truss, while receivers are attached to each elongated member of a second truss. The buttons are simultaneously placed in the cradles of the receivers and the keepers installed. The connection is simple, quick, inexpensive to make and assemble, yet relatively solid and positive.

In place of using a locking clip, an alternative is to rotate one or more receivers after the button or buttons have been received. A spring bias plunger or some other means of preventing rotation is used in this embodiment to hold the rotated receiver from inadvertently rotating further. The receiver is advantageously knurled so that it may be readily grasped and turned preferably by hand. The plunger preferably includes a cam device or other similar device for retracting the plunger from the cavity into which it falls to prevent further rotation. The cam and the knurled wall on the receiver alleviate the need for extraneous tools while connecting the truss members together or disconnecting them. The most advantageous alignment of rotated receivers attached to a truss member occurs when the centerline of the cradles of each of the receivers passes near the centerline of the truss member. In this case, the only way the two truss members could be unintentionally disconnected would be for the truss member with attached buttons to explode outwardly, which is unlikely.

The present connecting apparatus is further advantageous for use in creating space frame structures. A node may be formed to include a plurality of faces with a receiver or a button fastened to one or more of the faces. The other of a receiver or a button are fastened to one or more tubes or other structural members. The tubes may then be connected to the nodes in the usual fashion by placing a button in a cradle and locking it in place. Thus, in a fashion similar to connecting a pair of trusses together, the creation of a space frame using the present connecting mechanism is simple and quick, yet strong and positive. For use with the alternate embodiment connector hereinbefore described, nodes may be hollow or include hollow passageways to allow communication therethrough.

Thus, the present connecting mechanism is a significant improvement over known connectors, not only because of the simple design and consequent inexpensive manufacture, but also because of the ease of assembly, yet strength of connection and capability of preventing disconnection.

These advantages and other objects obtained by this invention are further explained and may be better understood by reference to the drawings and descriptive matter hereinafter. Preferred and other embodiments of the invention are illustrated and a detailed description is provided.

BRIEF DESCRIPTION OF THE DRAWINGS

FIG. 5 is a perspective view of connecting apparatus in accordance with the present invention for a pair of triangular trusses;

FIG. 6 is a perspective view, similar to FIG. 5, for a pair of box trusses;

FIG. 11 is a cross-sectional view of an alternate embodiment connecting apparatus in accordance with the present invention;

FIG. 12 is a cross-sectional view taken along line 12—12 of FIG. 11;

FIG. 13 is a cross-sectional view of a nut of the type shown in FIG. 11 along with a mating tool;

FIG. 14 is a cross-sectional view similar to FIG. 11, except showing a second alternate embodiment;

FIG. 15 is a perspective view of a portion of a space frame, similar to FIG. 4, except the alternate embodiment connnection devices of FIGS. 11 and 14 are shown both partially exploded and unexploded.

DETAILED DESCRIPTION OF THE PREFERRED EMBODIMENT

Figure 2:
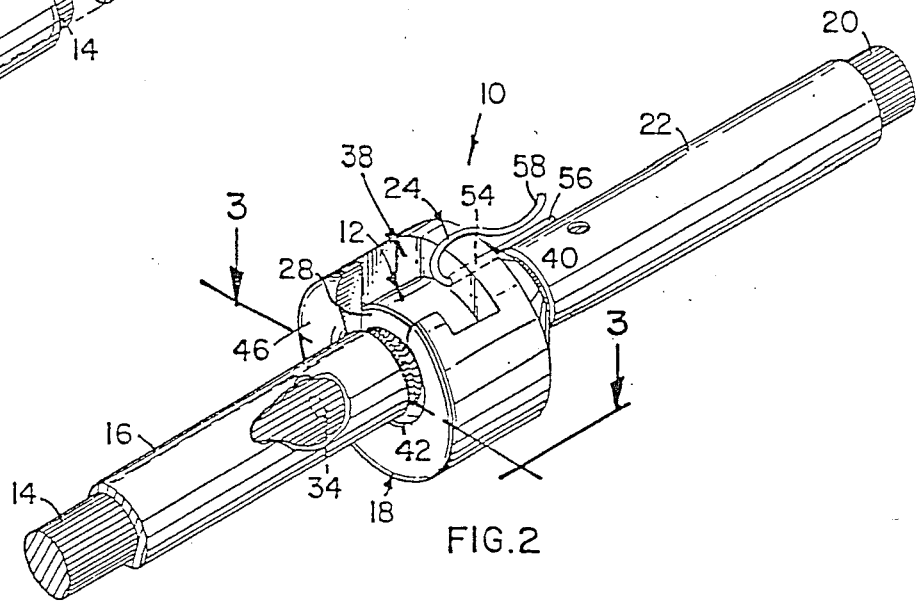
FIG. 2 is a perspective view of a pair of tubes connected with the interconnecting mechanism of the present invention.

In the drawings like reference numerals designate identical or corresponding parts throughout the several views. In like fashion, like numerals, only primed, or used with a following alphabetical letter, are used in description of corresponding parts for alternate embodiments and various applications. Referring now to FIG. 2, interconnecting apparatus in accordance with the present invention is designated generally by the numeral 10. Apparatus 10 includes a button 12 attached to a solid rod 14 fastened within tube 16. Button 12 is contained within receiver 18 fastened to rod 20 which is fixed to tube 22. Retainer clip 24 prevents button 12 from undesirably sliding out of receiver 18.

Figure 1:
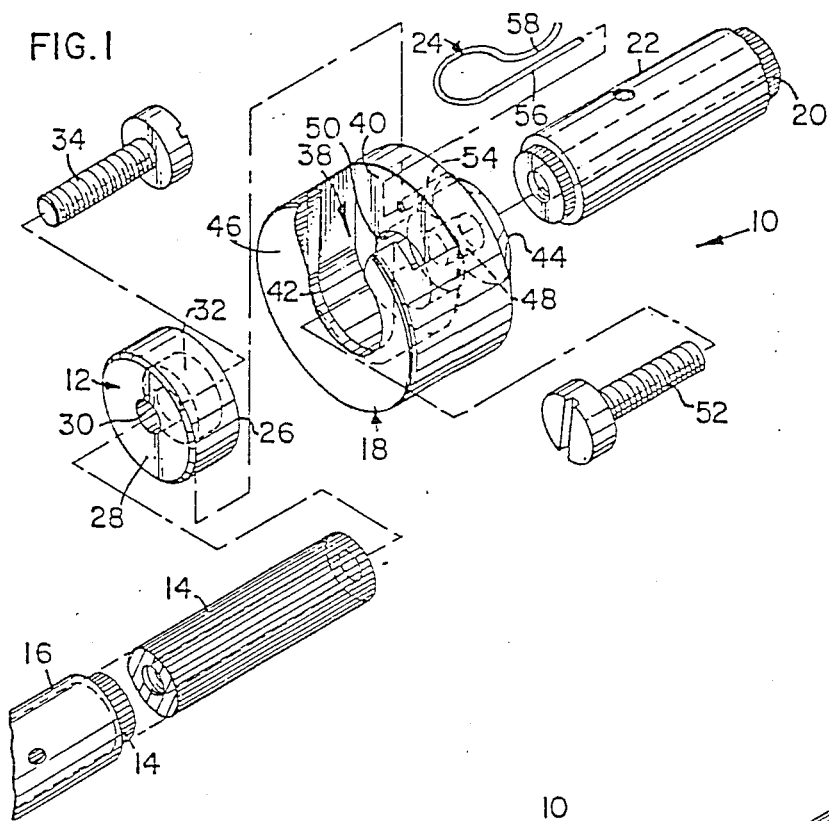
FIG. 1 is an exploded, perspective view of the interconnecting mechanism between a pair of tubes.
Figure 3:
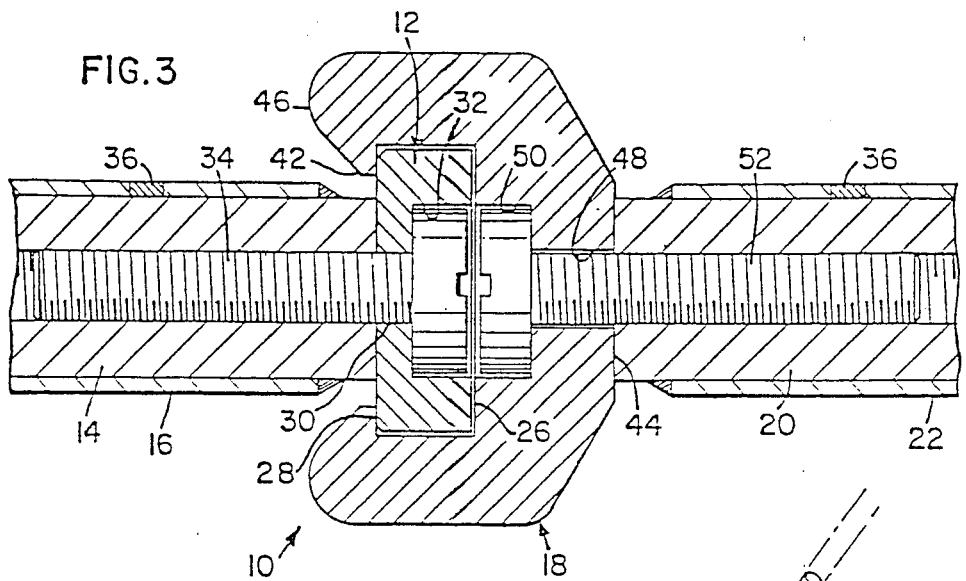
FIG. 3 is a cross-sectional view, taken along line 3—3 of FIG. 2.

More particularly, with reference to FIGS. 1-3 button 12 is a cylindrical block having a pair of ends 26, 28. Button 12 is provided with an axial passage 30 in combination with an axial cavity 32 in end 26 for receiving the shank and head of screw or bolt 34, respectively. Cavity 32 is sufficiently sized to receive the head of screw 34 so that it does not extend beyond end 26. Button 12 has sufficient thickness and diameter to retain necessary strength in spite of cavity 32 and passage 30.

Button 12 is fastened with screw 34 to rod 14. Rod 14 is a plug of several inches in length and is inserted in the end of tube 16 and attached with a plurality of randomly located spot welds 36. Preferably, rod 14 extends a short distance from the end of tube 16 so that tube 16 does not interfere with receiver 18 when button 12 is placed in receiver 18. Rod 14 provides for and strengthens the end of tube 16 for the attachment of button 12 with screw 34.

Receiver 18 is formed to include a cradle 38 with a wall 40 on one side and a lip 42 on the other. Receiver 18 is preferably a cylindrical block with ends 44, 46. End 44 may be trimmed at the corner to eliminate unnecessary mass. A sufficient flat surface, however, must be retained to butt against rod 20. Cradle 38 is formed to include a cavity extending inwardly from the cylindrical wall and ending in a semi-cylindrical curvature coaxial with the axis of the block. Lip 42 results when a slot centered on the cavity of cradle 38 is formed. The slot end is semi-cylindrical, and coaxial with the axis of the block. The slot between the sides of lip 42 has width sufficient to allow rod 14 to pass therethrough. Button 12 has a diameter greater than the diameter of rod 14 so that lip 42 retains button 12 from sliding axially from cradle 38. The width and cylindrical diameter of the cavity of cradle 38 is slightly greater than the diameter of button 12 to allow button 12 to be easily received by cradle 38, while yet maintaining a relatively snug abutment. End 46 is preferably rounded with the inner portion collapsing toward lip 42 so as to leave only a relatively short thickness for lip 42. In this way, end 46 and lip 42 do not interfere with tube 16 as rod 14 passes through the slot formed by lip 42.

An axial passage 48 extends through rear wall 40. Additionally, a cavity 50 is coaxial with the axis of receiver 18. As with passage 30 and cavity 32 of button 12, passage 48 and cavity 50 of receiver 18 are sized to receive screw 52. As with button 12, the thickness and diameter of receiver 18 are sufficient to provide the strength characteristics for a particular application. As indicated hereinbefore, end 44 of receiver 18 butts against rod 20 and is fastened thereto with screw 52. Rod 20 is a plug of several inches in length and is attached to tube 22 with a plurality of random spot welds 36 through openings in tube 22. As with rod 14, rod 20 provides for and strengthens the end of tube 22 for the attachment of receiver 18 with screw 52.

A locking mechanism, such as clip 24, is located to hold button 12 snugly in cradle 38. A number of equivalent locking mechanisms are possible, but a simple embodiment is shown to include a passage 54 in wall 40 at the top of button 12. Clip 24 has a lower leg 56 which passes through passage 54, and an upper leg 58 which retains clip 24 to the upper edge of wall 40.

Connector 10 may be used to interconnect a pair of tubes 16, 22, as shown in FIG. 2. Also, a plurality of connectors 10 may be used in a similar fashion to connect a pair of trusses together as shown in FIGS. 5 and 6. Trusses 60, 62 in FIG. 5 each have three tubes 16', 22'. Various webbing rods are welded or otherwise attached to hold the tubes in a fixed, spaced-apart structural relationship. A button 12' is attached to the end of each tube 16' at a rod 14' in the fashion described hereinbefore. Similarly, a receiver 18' is attached to the end of each tube 22' at a rod 20'. With such configuration, truss 62 is connected to truss 60 by simply sliding all of buttons 12' into receivers 18' simultaneously. Appropriate lock mechanisms prevent the trusses from inadvertently separating.

Trusses 66, 68 in FIG. 6 are connected together in a similar fashion. Trusses 66, 68 each have four tubes 16", 22" connected together with webbing 64". Buttons 12" and receivers 18" are attached in the fashion described hereinbefore. All of buttons 12" are received simultaneously by receivers 18" to hold truss 66 to truss 68. A locking mechanism for each of connectors 10" prevents inadvertent disconnection.

Figure 4:
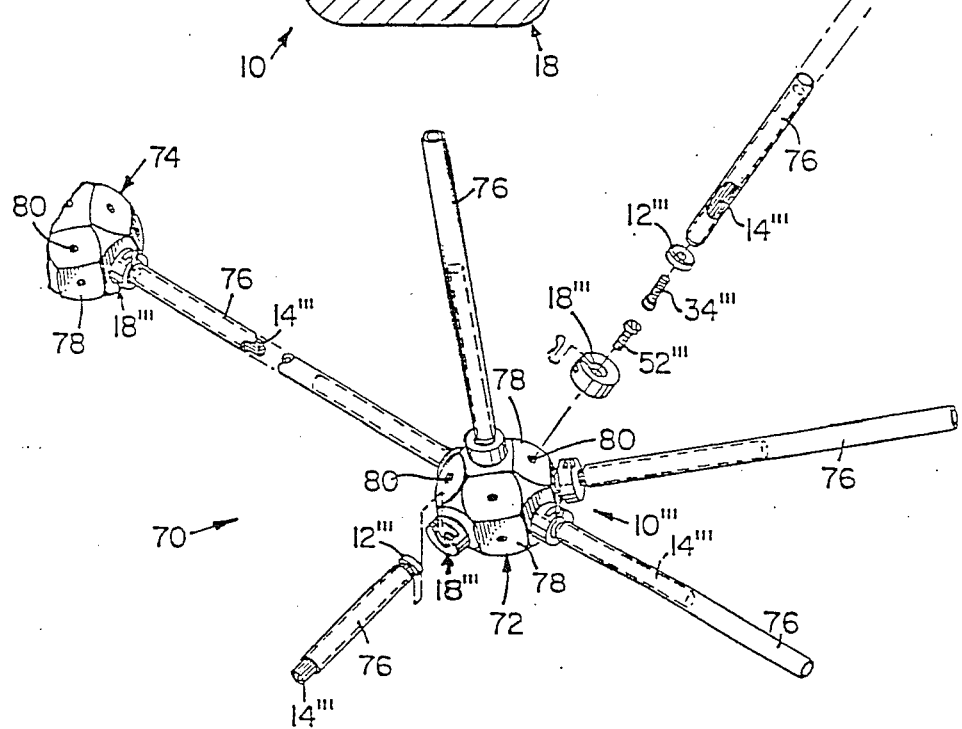
FIG. 4 is a perspective view of a portion of a space frame, showing two nodes and a plurality of connecting tubes, wherein connectors in accordance with the present invention are used.

As shown in FIG. 4, interconnect mechanism 10 may also be used in a space frame structure designated herein as 70. Space frame 70 includes nodes 72, 74. A plurality of tubes 76 extend between nodes 72, 74 and other nodes (not shown) or other structural members (not shown). Each node, for example 72, has a plurality of faces 78. Centered in each face is a threaded passage 80. A receiver 18''' is attached to the various faces 78 which are needed for use as attachments. Receivers 18''' are attached with a screw 52''' in the same fashion as screw 52 attaches a receiver 18 to a rod 20. Tubes 76 have buttons 12''' attached at both ends in order to be received at each node. Since a node may be formed to have faces in a variety of directions and since a tube may be connected to extend generally perpendicular to any particular face, nodes and tubes may be used to create a variety of designs in the usual fashion of space frames and, consequently, may be used in any of the various applications appropriate for space frames. The present invention, however, is particularly advantageous for space frame creation since it is so rapidly assembled and disassembled, while yet maintaining structural integrity and strength.

In use, as indicated, the present interconnecting mechanism is rapidly assembled. The buttons and receivers are preattached to rods, tubes, trusses or similar structural members. At an assembly site, assemblers simply insert the buttons into the receivers so the buttons rest in the cradles of the receivers and are retained between the lips and end walls of the cradles. The buttons are locked in place using, for example, a clip 24 or some other locking mechanism. In the case of space frame assembly, receivers 18''' are attached to appropriate faces 78 of nodes. Tubes 76 with buttons 12''' at both ends are extended between a pair of nodes and slipped in the receivers and locked in the same fashion as hereinbefore indicated. Various structural designs may be assembled since the faces of the nodes face in many directions and numerous structural tubes may be attached to each node. Disassembly of the space frame or of other structural connections using apparatus 10 is possible and rapidly accomplished simply by removing or releasing the locking device and slipping the structural members having buttons from the receivers of attached structural members. Thus, not only is diverse and rapid assembly facilitated, but disassembly is easy and reuse of the structural members and connecting devices is feasible and incredibly advantageous.

Figure 7:
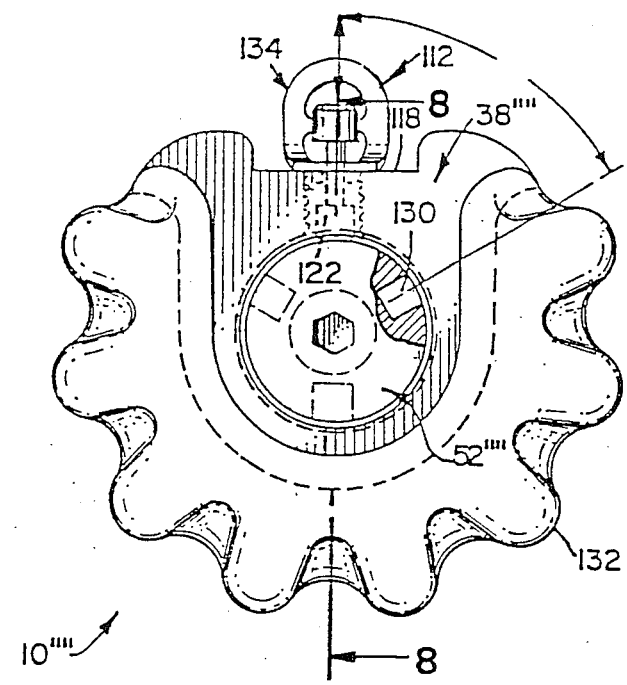
FIG. 7 is an end elevational view of an alternate embodiment of a receiver in accordance with the present invention.
Figure 8:
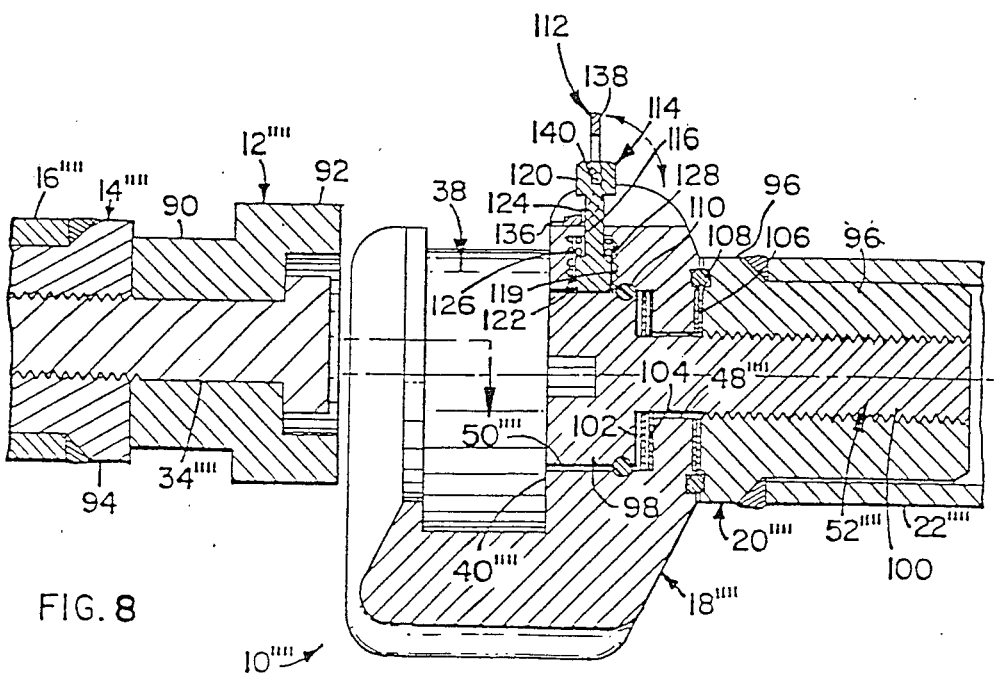
FIG. 8 is a cross-sectional view taken along line 8—8 in FIG. 7 and also showing a cross-sectional view of a button as attached to a tubular member.

As an alternative to clip 24 for locking a button in a receiver, FIGS. 7-10 show an alternate embodiment of the connecting apparatus of the present invention which provides for rotation of the receiver with respect to the member to which it is attached. Referring to FIGS. 7 and 8, connector apparatus 10'''' is shown with a button 12'''' attached to a plug 14'''' in the end of a tubular member 16'''' with a bolt 34''''. In this embodiment, button 12'''' is shown to have a neck portion 90 having a smaller diameter than the diameter of the outer portion 92 which is received in receiver 18''''. Also, plug 14'''' extends somewhat beyond the end of tubular member 16'''' with the extended portion 94 having a diameter approximately equal to the outer diameter of tubular member 16''''.

Receiver 18'''' is fastened to plug 20'''' with bolt 52''''. Plug 20'''' is formed similar to plug 14'''' to have an extending portion 96 with a diameter approximately the same as the outer diameter of tubular member 22''''. Plug 20'''' is welded or otherwise attached to tubular member 22'''' as is plug 14'''' to tubular member 16''''. Receiver 18'''' is formed to include a cradle 38'''' in the fashion of cradle 38 described hereinabove. The back wall 40'''' includes a cavity 50'''' and an axial passage 48'''' for receiving the head 98 and shank 100 of bolt 52''''. A metallic bushing 102 is located between head 98 and the back wall 104 of the cavity which receives head 98. Another metallic bushing 106 is located between the facing surfaces of receiver 18'''' and plug 20''''. The metallic bushings 102 and 106 allow receiver 18'''' to be rotated without loosening bolt 52''''. In this regard, bolt 52'''' is preferably held in place with an appropriate adhesive material between its threads and the threads of plug 20'''' or with other known locking mechanism. A first O-ring seal 108 may be formed in the facing surface of either plug 20'''' or receiver 18''''. A second O-ring seal 110 may be formed in either the wall surface of cavity 50'''' or in the surface of head 98. Seals 108 and 110 enclose a space which includes bushings 102 and 106 so that a lubricant grease may be used in the space to make rotation of receiver 18'''' easier.

A mechanism for preventing rotation of receiver 18'''' is provided so that undesirable or inadvertent rotation is not possible. The preventing mechanism 112 includes a plunger 114 located along the centerline of cradle 38'''' in the outer wall 118 of receiver 18'''' in the space between cavity 38'''' and plug 20''''. A passage 116 is formed in outer wall 118 having a smaller diameter near the outer wall 118 and a larger diameter portion 120 near the cavity 50'''' for head 98 of bolt 52''''. Plunger 114 is formed to have larger diameter knobs 120 and 122 with a neck 124 therebetween. A coil spring 126 is located between wall 128 at the end of the larger diameter passage 118 and knob 122 of plunger 114 which is fitted in portion 118. Thus, plunger 114 is biased so that knob 122 is forced against head 98 of bolt 52''''.

Head 98 includes at least one cavity 130 in its cylindrical surface for receiving knob 122 of plunger 114 and thereby preventing further rotation of receiver 18'''' with respect to structural member 22''''. It is often desirable to include a plurality of egually spaced cavities 130 about head 98.

The present interconnecting apparatus may be used without the necessity of other tools to aid in connecting one structural member to another. In this regard, it is preferable to form the outer cylindrical surface 132 of receiver 18'''' with grooves or knurls so that it may be easily grasped and turned. It is also preferable to have a mechanism such as cam 134 in operable attachment to plunger 114 so that plunger 114 may be easily functioned without the need of a pliers or other tool. Cam 134 has an arcuate portion 136 near wall 118 and a straight portion 138 extending away therefrom. Cam 134 is pivotally attached to knob 120 of plunger 114 at pivot pin 140. Thus, when plunger 114 moves into a cavity 130, straight portion 138 of cam 134 forms a slight incline with wall 118. To retract plunger 114 from cavity 130, straight portion 138 is pivoted about pin 140 to force arcuate portion 136 against wall 118 and move plunger 114 radially outwardly.

Figure 9:
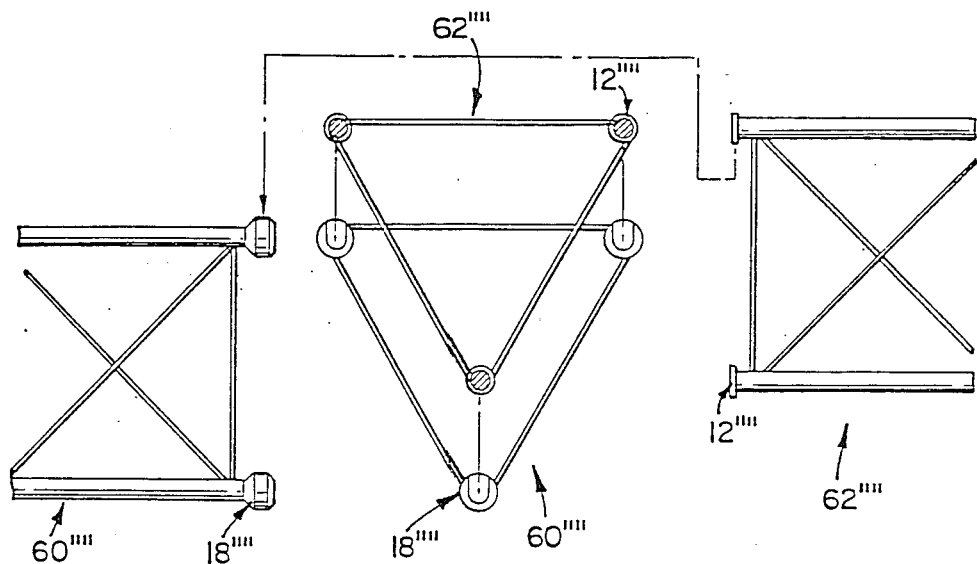
FIG. 9 shows both a side elevation and an end elevation of first and second truss members coming together for connection.
Figure 10:
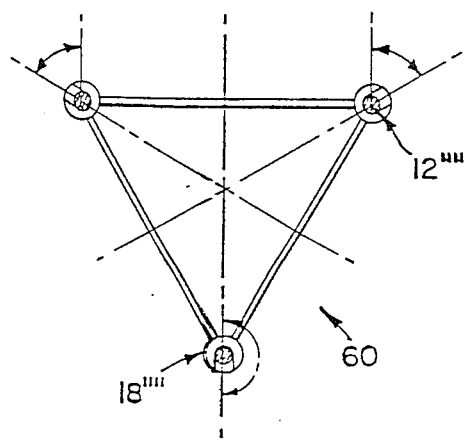
FIG. 10 shows an end elevational view of two connected truss members with one of the truss members in cross section.

In use, and in reference to connecting first and second trusses 60'''' and 62'''' together, reference is made to FIGS. 9 and 10. All receivers attached to first truss 60'''' are oriented so that the cradles open in the same direction and the centerlines of the cradles are generally parallel to one another. In this fashion, the buttons 12'''' of second truss 62'''' are easily slipped into all cradles simultaneously. Trusses 60'''' and 62'''' are locked together by rotating each receiver until further rotation is prevented by a functioning of plunger 114. Preferably, each receiver is rotated so that the cradles open outwardly from the centerline of truss 60'''' and the centerlines of the various cradles come close to intersecting near the centerline of truss 60''''. It is understood, of course, that exactness is not reguired with respect to the intersection of the various cradle centerlines, but the closer such intersection comes to the centerline of truss 60'''', the more unlikely an inadvertent rotation of one or more of receivers 18'''' would occur and an inadvertent disconnection take place. Disconnection of trusses 60'''' and 62'''' is accomplished by levering the plungers 114 out of cavities 130 with cams 134 and rotating the receivers so the cradles again open in the same direction and the cradle centerlines are generally parallel. Truss 60'''' is then lifted from truss 62'''' thereby moving buttons 12'''' from receivers 18''''.

As a further alternative, FIGS. 11-15 show an alternate embodiment of the connecting apparatus of the present invention which provides for communication therethrough of a material, a substance, light or some other form of energy or matter. More specifically, with reference to FIGS. 11 and 12, an interconnecting apparatus in accordance with this alternative is designated by the alphanumeric symbol 10a. Apparatus 10a is an interconnection for fastening tubes 16a and 22a together. Rather than rods 14 and 20 and buttons 12, apparatus 10a includes a button member 150 welded or otherwise attached to tube 16a and button member 152 welded or otherwise attached to tube 22a. Button members 150 and 152 are similar, except as indicated hereinafter. Considering button member 150 as exemplary, it has first and second end portions 154 and 156. Button member 150 along first end portion 154 has a cylindrical portion 156 which fits within tube 16a. Cylindrical portion 156 has a first diameter. Button member 150 along second portion 156 has a flange-like button 158 with a second diameter. The second diameter of button 158 is greater than the first diameter of cylindrical portion 156. Button member 150 also has an axial passageway 160 extending through it to provide for communication therethrough.

Button member 152 is the same as button member 150, except the diameter of button 162 is less than the diameter of button 158. The diameter of cylindrical portion 164 of button member 152 is preferably the same as the diameter of cylindrical portion 156. The diameters of buttons 158 and 162 are different since button 162 must fit through the slot between lips 42a, while button 158 must be retained by lips 42a and prevented from sliding through the slot therebetween.

Receiver 18a is similar to receiver 18 except cavity 50a in the portion nearest tube 22a is sized to receive button 162. Cavity 50a in portion 166 nearest cradle 38a is threaded. A nut 168 is threaded into portion 166 so as to contact button 162 and so as not to protrude into cradle 38a. Nut 168 retains receiver 18a snugly to button 162. Preferably, however, nut 168 is not so tight as to prevent rotation of receive 18a and the benefits resulting therefrom as discussed hereinbefore. It is noted that nut 168 has a hollow passageway 170 which is aligned with passageways 160 of button members 150 and 152.

As shown in FIG. 13, nut 168 includes two or more holes 172 in the surface facing button 158. A tool 174 having protuberances 176 which mate with holes 172 may then be used to thread nut 168 into threaded portion 166 of cavity 58.

A further alternate embodiment is shown as apparatus 10b in FIG. 14. Apparatus 10b is similar to apparatus 10a except cavity 50a does not include threaded portion 166 and threaded nut 168 is not used. The function of the deleted part is accomplished with clip 178 (see also FIG. 15) which has a ringular, plate-like shape extending approppriately three-guarters of the way around cylindrical portion 164b of button member 152b. Clip 178 fits into a groove 180 which is located adjacent to end 44b of receiver 18b when receiver 18b is snug against button 162b. Groove 180 may extend completely around cylindrical portion 154b, but preferably is rather a pair of short grooves on opposite sides of cylindrical portion 164b, so as not to unduly weaken button member 152b in that region. Since passageways 160b of button members 150b and 152b are aligned, as in apparatus 18a, communication between the adjacent structural members represented by tubes 16b and 22b is possible.

Both embodiments 18a and 18b are shown in a space frame environment in FIG. 15. In this regard, it is noted that nodes 72c, and 74c, may be hollow so as to preserve the possibility of communication through the interior of adjacent structural members. It is also noted that receivers are installed at the ends of particular tubes 76c. In this way, the receivers may be more easily aligned for receiving mating button members 150c, which are attached to nodes 72c and 74c.

Once the button members and receivers, as well as either nut 168 or clip 178, are installed, embodiments 18a or 18b are used in a fashion similar to alternate embodiments 10'''', since receivers 18a and 18b are rotatable in the fashion of receiver 18''''. The particular advantage of embodiments 10a or 10b are that wiring, fluid, light, or some other substance material or energy form may be communicated through the interior of the interconnect mechanism from one structural member to another.

The description hereinbefore has been directed to preferred and alternate embodiments having several applications. It is understood, however, that the structural members, rods, buttons and receivers need not be cylindrical in shape. It is only necessary that various parts mate in the sense of the embodiments described. In like fashion, it is understood that the tubes, trusses and space frame applications presented are only representative of the numerous applications possible with the present invention. Consequently, although numerous advantages and details of structure and function have been set forth, they must be considered exemplary. Changes made, especially in matters of shape, size, and arrangement, to the full extent extended by the general meaning of the terms in which the appended claims are expressed are understood to be within the principle of the present invention.

What is claimed is:

1. Interconnect apparatus between first and second structural members, comprising:
   a button member having first and second end portions, said button member along the first end portion having a cylindrical portion with a first diameter and along the second portion having a flange-like portion with a second diameter, the second diameter being greater than the first diameter;
   first means for fastening said button member to said first structural member;
   means for receiving said flange-like portion of said button member, said receiving means including a cradle having a wall on one side and a lip on an opposing side, said cradle being shaped to receive relatively snugly said flange-like portion between said wall and said lip; and
   second means for fastening said receiving means to said second structural member with said lip on a side of said wall opposite said second structural member, said second fastening means including means for rotatably moving said receiving means with respect to said second structural member;
   whereby receipt of said flange-like portion in said cradle interconnects said first and second structural members and rotation of said receiving means prevents said flange-like portion from moving out of said cradle in the same direction as it was received in said cradle.

2. Interconnect apparatus between first and second structural members, comprising:
   a button member having first and second end portions, said button member along the first end portion having a cylindrical portion with a first diameter and along the second portion having a flange-like portion with a second diameter, the second diameter being greater than the first diameter, said button member also including an axially-directed, first hollow passageway therethrough;
   first means for fastening said button member to said first structural member;
   means for receiving said flange-like portion, said receiving means including a cradle having a wall on one side and a lip on an opposing side, said cradle being shaped to receive relatively snugly said flange-like portion between said wall and said lip; and
   second means for fastening said receiving means to said second structural member with said lip on a side of said wall opposite said second structural member, said second fastening means including a second hollow passageway, said first and second hollow passageways being generally aligned;
   whereby receipt of said flange-like portion in said cradle interconnects said first and second structural members while said aligned first and second passageways provide for communication therethrough.

3. The apparatus in accordance with claim 2 wherein said second fastening means includes means for rotatably connecting said receiving means to said second structural member.

4. Interconnect apparatus between first and second structural members, comprising:

first and second button members each having first and second end portions, each of said button members along the first portion having a cylindrical portion with a first diameter and along the second end portion having a flange-like portion with a second diameter, the second diameter being greater than the first diameter, said button members including aligned first hollow passageways;

first and second means for fastening said first and second button members to said first and second structural members, respectively;

means for receiving said flange-like portion of said first button member, said receiving means including a cradle having a wall on one said and a lip on an opposing side, said cradle being shaped to receive relatively snugly said flange-like portion of said first button member between said wall and said lip with said cylindrical portion of said first button member fitting over said lip, said receiving means further including a second passageway for receiving the cylindrical portion of said second button member, said second passageway having a third diameter greater than said second diameter so that said second button member holds said receiving means to said second structural member; and means for limiting movement of said receiving means along said cylindrical portion of said second button member in a direction toward said second structural member, said limiting means allowing rotation of said receiving means with respect to said second structural member.

5. The apparatus in accordance with claim 4 wherein said receiving means includes a cavity in said wall, said cavity being partially threaded, said flange-like portion of said second button member fitting in said cavity, said movement limiting means including a threaded washer for threading into said cavity and securing said receiving means between said flange-like portion of said second button member and said washer.

6. The apparatus in accordance with claim 5 wherein said threaded washer includes a third passageway aligned with said first and second passageways to allow communication through said interconnect apparatus.

7. The apparatus in accordance with claim 5 wherein said washer includes means for engaging with a special tool for rotating said washer with respect to said cradle.

8. Apparatus in accordance with claim 4 wherein said movement limiting means includes a clip for fitting more than halfway around the circumference of said cylindrical portion of said second button member, said clip fitting between said receiving means and said second structural member, thereby limiting the axial movement of said receiving means along said cylindrical portion in a direction toward said second structural member.

9. Interconnect apparatus for a space frame, comprising:

a tube having an end;
a node with a plurality of faces;
first and second button members, said button members each having first and second end portions, each of said button members along the first end portion having a cylindrical portion with a first diameter and along the second portion having a flange-like portion with a second diameter, the second diameters being greater than the first diameters;
first means for fastening said first button member to the end of said tube;
second means for fastening said second button member to one of said faces of said node;
means for detachably receiving one of said flangelike portions of said first and second button members, said receiving means including a cradle having a wall on one side and a lip on an opposing side, said cradle being shaped to receive relatively snugly said one flange-like portion between said wall and said lip; and
third means for fastening said receiving means to the other of said flange0like portions of said first and second button members.

10. The apparatus in accordance with claim 9 wherein said second fastening means is a unitary connection of said second button member formed as a part of said node.

11. The apparatus in accordance with claim 9 wherein said tube and said node are hollow and wherein said apparatus further includes means for communicating internally through said apparatus from said tube to said node.

12. The apparatus in accordance with claim 11 wherein said communicating means includes first and second passageways through said first and second button members, respectively, and a third passageway through said receiving means.

* * * * *